United States Patent
Bianu

(10) Patent No.: US 6,757,910 B1
(45) Date of Patent: Jun. 29, 2004

(54) ADAPTIVE FILTER FOR REDUCING INGRESS NOISE IN CATV RETURN SIGNALS

(75) Inventor: Dan Bianu, Cupertino, CA (US)

(73) Assignee: C-Cor.Net Corporation, State College, PA (US)

(*) Notice: Subject to any disclaimer, the term of this patent is extended or adjusted under 35 U.S.C. 154(b) by 621 days.

(21) Appl. No.: 09/590,933

(22) Filed: Jun. 8, 2000

(51) Int. Cl.[7] ............................................. H04N 7/173
(52) U.S. Cl. ..................... 725/125; 725/127; 725/149
(58) Field of Search ................................ 725/125, 127, 725/128, 129, 149, 126; 327/552; 370/290; 379/406.08, 406.09; 381/71.11; 333/17.1; 455/125, 339, 340; 348/725, 731, 735

(56) References Cited

U.S. PATENT DOCUMENTS

| | | | | |
|---|---|---|---|---|
| 5,091,956 A | * | 2/1992 | Miki ............................ | 381/98 |
| 5,371,695 A | * | 12/1994 | Baraszu ....................... | 708/322 |
| 5,717,717 A | * | 2/1998 | Yang et al. .................. | 375/232 |
| 5,742,591 A | * | 4/1998 | Himayat et al. ............. | 370/286 |
| 5,881,363 A | * | 3/1999 | Ghosh et al. ................ | 725/125 |
| 5,893,024 A | * | 4/1999 | Sanders et al. ............. | 725/125 |
| 5,915,205 A | * | 6/1999 | Chen ............................ | 725/125 |
| 5,937,330 A | * | 8/1999 | Vince et al. ................. | 725/125 |
| 5,966,410 A | * | 10/1999 | Freyman et al. ............ | 375/296 |
| 6,047,022 A | * | 4/2000 | Reuven ....................... | 375/222 |
| 6,049,693 A | | 4/2000 | Baran et al. ................. | 455/3.1 |
| 6,229,857 B1 | * | 5/2001 | Wagner et al. .............. | 375/316 |
| 6,321,384 B1 | * | 11/2001 | Eldering ...................... | 725/125 |
| 6,359,939 B1 | * | 3/2002 | Calderone ................... | 375/316 |
| 6,433,906 B1 | * | 8/2002 | Farhan ........................ | 398/66 |

FOREIGN PATENT DOCUMENTS

WO  WO 9416496 A1 * 7/1994 ............ H03H/7/46

* cited by examiner

Primary Examiner—John Miller
Assistant Examiner—Scott Beliveau
(74) Attorney, Agent, or Firm—Oblon, Spivak, McClelland, Maier & Neustadt, P.C.

(57) ABSTRACT

An adaptive high pass filter is used to reduce signal noise such as that occurring on a CATV upstream carrier. A signal detector senses a lowest active frequency on a CATV transmission. A high pass filter is then adjusted to cut off transmissions at frequencies below the lowest active frequency. This reduces ingress noise present in the upstream channel.

6 Claims, 2 Drawing Sheets

ADAPTIVE FILTER FOR REDUCING INGRESS NOISE IN CATV RETURN SIGNALS

FIELD OF THE INVENTION

This invention relates to systems and methods for signal noise reduction in electrical systems. More particularly, the invention relates to systems and methods for signals such as those used in CATV upstream channels.

BACKGROUND OF THE INVENTION

The demand for CATV bandwidth and types of signals transmitted on CATV is increasing. A typical cable TV system includes 80 or more analog TV channels, expandable in capacity to include 132 or more digital channels, data channels, and telephony signals. Analog video, QAM (quadrature amplitude modulation), QPSK (quadrature phase shift keying), digital video, data, and telephony signals are modulated on analog RF carriers. Digital video systems also provide video on-demand services.

One of the issues with modulated signals is signal noise. Signal noise effectively reduces the ability to transmit signals at low power levels and can cause distortion and error in demodulated output signals.

Upstream signals in a CATV system include a variety of signals, such as transmission of internet signals.

In CATV systems, there are multiple levels of carriers. In optically transmitted CATV signals, the optical transmission is a modulated carrier. The modulation is typically an RF signal which is a CATV carrier. The RF CATV carrier includes multiple channels, which themselves are carriers. When carriers are discussed herein, it is meant to include a signal which may be filtered in accordance with the invention. Examples of such carriers are EIA channels included in a CATV transmission and internet transmissions.

SUMMARY OF THE INVENTION

According to the present invention, a CATV filter circuit includes a detector circuit, an electronically adjustable adaptive high pass filter, and a control circuit. The detector circuit detects a lowest frequency used by signals in an upstream path, and the control circuit responds to the circuit for detecting. The adaptive high pass filter is electronically adjustable as a cutoff frequency. The control circuit responds to the circuit for detecting, and adjusts the cutoff frequency of the adaptive high pass filter to a frequency below the lowest frequency used by the signals in the upstream path. This has the affect of blocking ingress noise to an extent permitted by a frequency plan used in the upstream spectrum.

According to a particular aspect of the present invention, the CATV filter circuit uses artificial intelligence to further separate noise from signal by determining which transmissions are desired signals. Signals which do not meet predetermined criteria for signal transmission are then filtered. According to one embodiment of the present invention, the present criteria includes detection of a predetermined signal characteristic and a lowest frequency associated with the detection of a signal associated with that signal characteristic.

According to a further aspect of the present invention, the CATV filter circuit monitors signals in the upstream path on an ongoing basis. A control circuit uses two time constants, a first time constant for lowering the cutoff frequency and a second time constant for raising the cutoff frequency. This permits raising of the cutoff frequency after a time period consistent with termination of upstream path transmissions and lowering the cutoff frequency after a time period consistent with transmissions. The time period for lowering the cutoff frequency is sufficiently long to reduce false or spurious signal detection.

According to a further aspect of the present invention, the CATV filter curcuit includes a temperature compensation circuit.

According to a further aspect of the present invention, the CATV filter circuit includes a microprocessor. The microprocessor permits selection of signal criteria by determining which transmissions are desired signals and filtering transmissions which do not meet predetermined criteria for signal transmissions. The criteria includes at least detection of a signal characteristic and a lowest frequency associated with the detection of a signal associated with the predetermined signal characteristic.

According to a further aspect of the present invention, a high pass filter circuit and method are employed according to the present invention to reduce ingress transmission noise in a laser or other electronic system or device, and to reduce downstream distortion. According to one embodiment, the filtered signals are used to modulate a laser diode or an electrical system. The distortion signals compensate for anticipated distortions caused by the laser diode or other electrical system, leaving good quality signals such as CATV pictures, for example. According to a further aspect of the invention, a CATV transmitter is provided with a high pass filter.

One source of noise on CATV systems is low frequency noise. This originates from obvious sources such as 50/60 Hz AC transmission hum and from less obvious sources such as AM broadcast radio and other radio transmissions. The effect of such noise is a degradation of signal at desired modulation frequencies such as those used with QAM, QPSK, FM or PM signals.

While it is possible to establish fixed low frequency cutoffs, there are certain frequencies which are used in CATV transmissions and that are also particularly susceptible to low frequency noise.

DETAILED DESCRIPTION OF THE PREFERRED EMBODIMENTS

Figure 1:
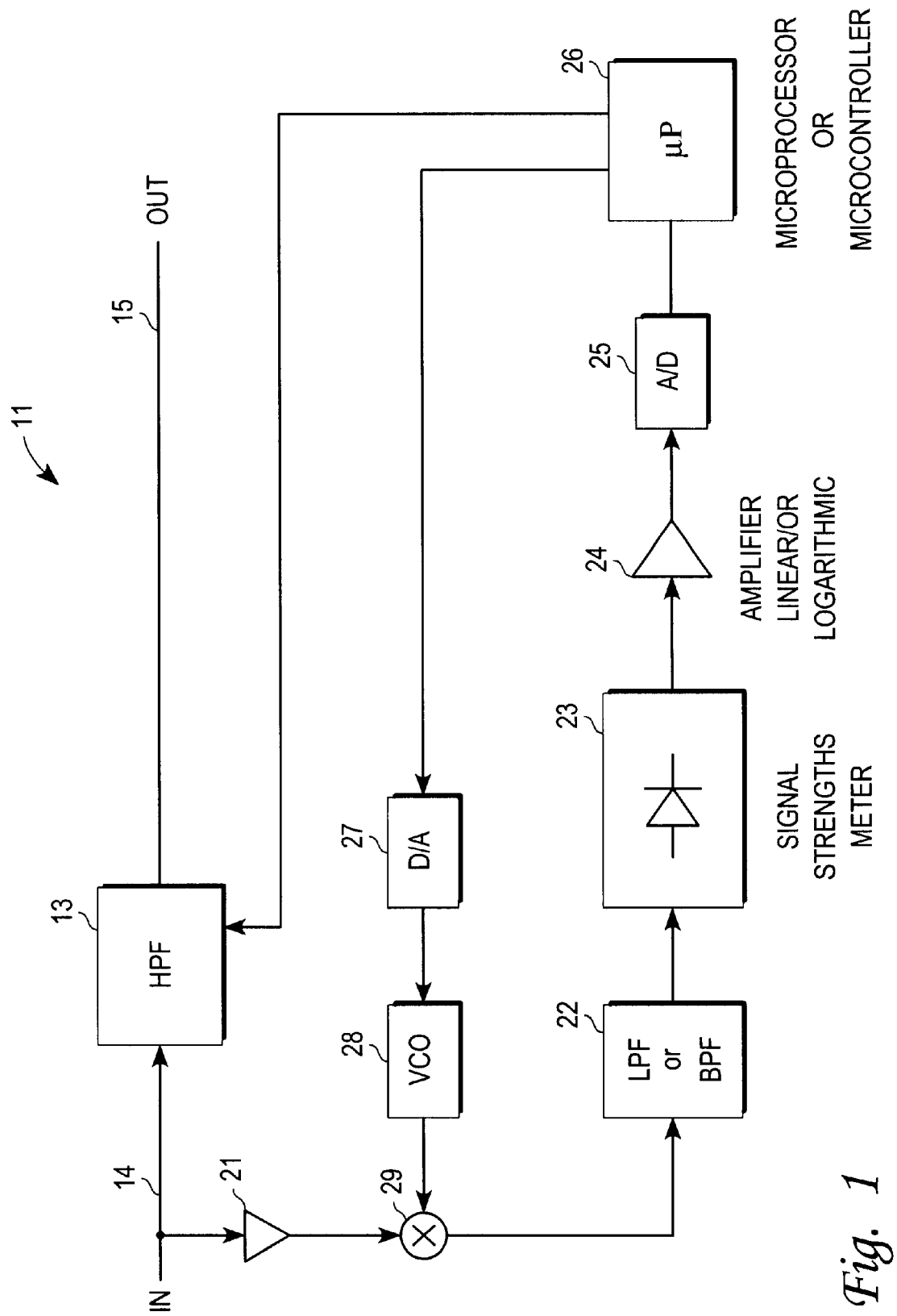
FIG. 1 is a schematic block diagram showing the components of a filter circuit according to the present invention.

Referring to FIG. 1, there is shown a schematic block diagram showing the components of a filter circuit 11 constructed according to the present invention. The filter circuit includes an adjustable high pass filter 13 receiving a signal from an input line and passing the processed signal to an output line 15. Also depicted is a local amplifier or buffer 21 for sensing the processed signals from the input line 14, a low pass filter or a bandpass filter 22, a signal strength meter 23, a second amplifier 24, an analog-to-digital converter 25 and a microcontroller or microprocessor 26. The microprocessor 26 has outputs to the adjustable high pass filter 13 and to a digital-to-analog converter 27. The digital-to-analog converter 27 provides an output signal to a voltage controlled oscillator (VCO) 28, which in turn provides a signal to a mixer 29.

Signals from the local amplifier/buffer 21 are multiplexed by mixer 29. The second amplifier 24 is either linear or non-linear, and the digitized signals from amplifier 24 are used to control the microprocessor 26. Microprocessor 26 is able to detect a signal pattern consistent with an anticipated lowest frequency used by the signals in the upstream paths, and to control the adjustable high pass filter 13 to exclude transmissions of frequencies below the frequency used by the signals in the upstream spectrum.

The high pass filter 13 is connected between the input 14 and output 15 of the filter circuit 11. The signal at the input 14 is buffered and/or amplified by amplifier 21 and is then frequency shifted by mixer 29. The VCO drives the mixer 29 and is in turn driven by the digital-to-analog converter 27, which is driven by the microprocessor 26 and provides a linear or non-linear ramp signal. The filter 22 drives amplifier 24, which may be linear or logarithmic. The output from filter 22 is digitized by analog-to-digital converter 25 and is supplied to the microprocessor 26.

By way of example, it is possible for a CATV system to use particular channels or frequencies on an occasional basis. According to the present invention, the high pass filtering is performed below the lowest active frequency. Thus, if no transmission below a particular frequency is in use at a particular time, filtering would remove signals below that frequency. If a particular frequency is active, filtering is adjusted below that frequency, unless the microprocessor 26 provides a signal to ignore transmissions on that particular frequency.

There are some instances where a carrier signal may be present for a particular frequency but the carrier signal does not carry broadcast or other transmissions. Lack of activity can be detected by a lack of signal activity consistent with normal transmissions. The detected signal activity is preferably detected so as to coincide with actual signal transmissions as opposed to the transmission of an empty carrier. This permits blocking of lower frequencies when no active transmission is taking place regardless of whether a carrier signal is present.

In a further refinement of the invention, the user can specify which frequencies are received. If the specified frequencies are above a particular frequency, the high pass filter 13 can be adjusted to filter below the specified frequencies. Thus, even if particular low frequency transmissions are present on a CATV system, the cognizant frequencies can be filtered. In addition, it is possible to further detect the lowest frequency which is active exclusive of the particular low frequency transmissions, thereby further reducing low frequency transmission noise.

It is possible to program the microprocessor 16 to further exclude signals by complex criteria. Thus, in addition to the use of a high pass filter 13, it is also possible to use a bandpass filter or other appropriate filter, should a signal be detected which exhibits characteristics other than those anticipated for signals used in the upstream spectrum.

Figure 2:
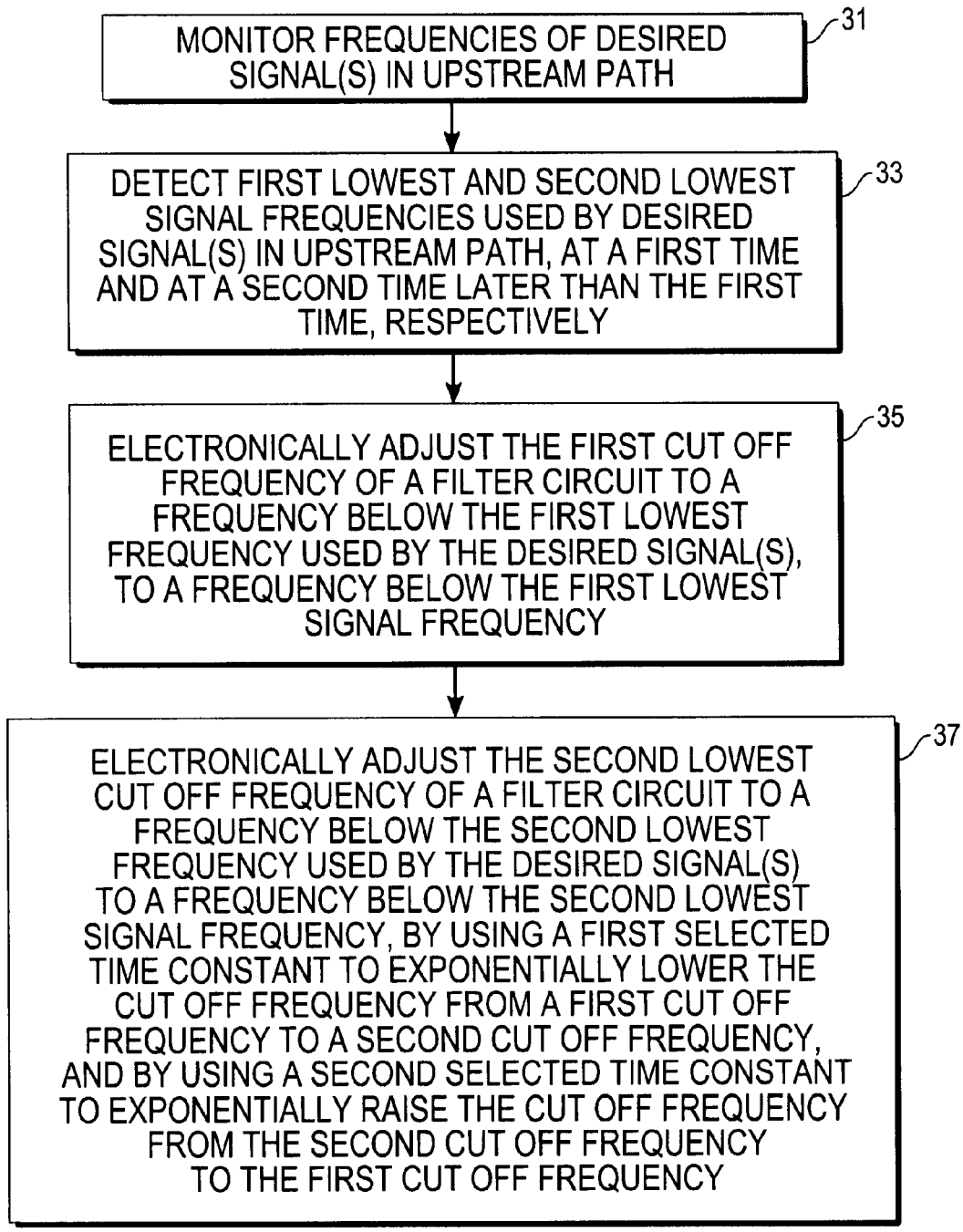
FIG. 2 is a flow chart of a procedure for practicing the invention.

FIG. 2 is a flow chart illustrating a procedure for practicing the invention. In step 31, frequencies of one or more desired signals are monitored in an upstream path. In step 33, a first lowest signal frequency and a second lowest signal frequency used by the desired signal(s) in an upstream spectrum are detected, at a first time and at a second time later than the first time. In step 35, a first cutoff frequency of a signal filter circuit is electronically adjusted, in response to detection of the first lowest signal frequency, to a frequency below the first lowest signal frequency. In step 37, a second cutoff frequency of the filter circuit is adjusted, in response to detection of the second lowest signal frequency, to a frequency below the second lowest signal frequency, by using a first selected time constant for exponentially lowering the cutoff frequency from the first cutoff frequency to the second cutoff frequency, and by using a second selected time constant for exponentially raising the cutoff frequency from the second cutoff frequency to the first cutoff frequency, thereby blocking a signal component having a frequency component below at least one of the first and second cutoff frequencies, to an extent permitted by a frequency plan used in the upstream spectrum, where at least one of the first and second time constants is selected to reduce the likelihood of false or spurious signal detection.

What is claimed is:

1. A method for reducing ingress noise from upstream signals in a communication network, the method comprising:

monitoring frequencies of a desired signal in an upstream path on an ongoing basis;

detecting a first lowest signal frequency and a second lowest signal frequency used by the desired signal in the upstream path at a first time and at a second time later than the first time, respectively;

electronically adjusting a first cutoff frequency of a filter circuit in response to detection of the detected first lowest signal frequency, to a frequency below the first lowest signal frequency used by the signals in an upstream spectrum; and electronically adjusting a second cutoff frequency of a filter circuit in response to detection of the second lowest signal frequency, to a frequency below the second lowest signal frequency used by the signals in the upstream path, by using a first selected time constant for exponentially lowering the cutoff frequency from the first cutoff frequency to the second cutoff frequency, and by using a second selected time constant for exponentially raising the cutoff frequency from the second cutoff frequency to the first cutoff frequency, thereby blocking a signal component having a frequency below at least one of the first and second cutoff frequencies, to an extent permitted by a frequency plan used in the upstream spectrum, where at least one of the first and second time constants is selected to reduce the likelihood of false or spurious signal detection.

2. The method of claim 1, further comprising using artificial intelligence to separate noise from signal by determining which transmissions are desired signal and filtering transmissions which do not meet predetermined criteria for signal transmissions, the predetermined criteria comprising detection of a predetermined signal characteristic and detection of said lowest signal frequency associated with detection of a signal associated with the predetermined signal characteristic.

3. A multichannel signal carrier filter circuit comprising:

a circuit for detecting first and second lowest signal frequencies used by a desired signal in an upstream path at a first time and at a second time later than the first time, respectively;

an adaptive high pass filter, having a dynamically and electronically adjustable cutoff frequency; and a control circuit, responsive to the circuit for detecting, for adjusting the cutoff frequency of the adaptive high pass filter to a first cutoff frequency and to a second cutoff frequency, below the lowest signal frequency used by the desired signals in the upstream path at the first time and at the second time, respectively, thereby blocking a signal component having a frequency below at least one of the first and second cutoff frequencies, to an extent permitted by a frequency plan used in an upstream spectrum, where a first selected time constant is used for exponentially lowering the cutoff frequency from the first cutoff frequency to the second cutoff frequency, and a second selected time constant is used for exponentially raising the cutoff frequency from the second cutoff frequency to the first cutoff frequency, where at least one of the first and second time constants is selected to reduce the likelihood of false or spurious signal detection.

4. The method of claim 1, wherein artificial intelligence is used to separate noise from signal by determining which transmissions are desired signal and filtering transmissions which do not meet predetermined criteria for signal transmissions, the predetermined criteria comprising detection of a predetermined signal characteristic and detection of said lowest signal frequency associated with detection of a signal associated with the predetermined signal characteristic.

5. A CATV system comprising:
   a circuit for detecting a lowest signal frequency used by a desired signal in an upstream path at a first time and at a second time later than the first time, respectively;
   an adaptive frequency selective filter, having a dynamically and electronically adjustable cutoff frequency; and
   a control circuit, responsive to the circuit for detecting, for adjusting the cutoff frequency of the adaptive frequency selective filter to a first cutoff frequency and to a second cutoff frequency, below the lowest signal frequency used by the desired signals in the upstream path at the first time and at the second time, respectively, thereby blocking a signal component having a frequency below at least one of the first and second cutoff frequencies, to an extent permitted by a frequency plan used in an upstream spectrum, where a first selected time constant is used for exponentially lowering the cutoff frequency from the first cutoff frequency to the second cutoff frequency, and a second selected time constant is used for exponentially raising the cutoff frequency from the second cutoff frequency to the first cutoff frequency, where at least one of the first and second time constants is selected to reduce the likelihood of false or spurious signal detection.

6. The method of claim 5, wherein artificial intelligence is used to separate noise from signal by determining which transmissions are desired signal and filtering transmissions which do not meet predetermined criteria for signal transmissions, the predetermined criteria comprising detection of a predetermined signal characteristic and detection of said lowest signal frequency associated with detection of a signal associated with the predetermined signal characteristic.

* * * * *